United States Patent
Zenno

(10) Patent No.: US 7,478,714 B2
(45) Date of Patent: Jan. 20, 2009

(54) STRADDLE-TYPE VEHICLE HAVING CLUTCH ENGAGEMENT CONTROL DEVICE AND METHOD OF USING CLUTCH ENGAGEMENT CONTROL DEVICE

(75) Inventor: Toru Zenno, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 415 days.

(21) Appl. No.: 11/301,288

(22) Filed: Dec. 12, 2005

(65) Prior Publication Data

US 2006/0124422 A1   Jun. 15, 2006

(30) Foreign Application Priority Data

Dec. 10, 2004   (JP) .............................. 2004-359224

(51) Int. Cl.
  F16D 48/08   (2006.01)
(52) U.S. Cl. .................. 192/3.56; 192/3.61; 192/52.4; 192/103 R
(58) Field of Classification Search ................ 192/52.4
See application file for complete search history.

(56) References Cited

U.S. PATENT DOCUMENTS

| | | | |
|---|---|---|---|
| 4,497,222 A | 2/1985 | Nagaoka et al. | |
| 4,620,624 A | 11/1986 | Mitsui et al. | |
| 4,712,658 A * | 12/1987 | Grunberg | 477/175 |
| 4,766,544 A | 8/1988 | Kurihara et al. | |
| 5,360,381 A * | 11/1994 | Swist | 477/175 |
| 5,964,680 A | 10/1999 | Salecker et al. | |
| 6,257,081 B1 | 7/2001 | Gagnon et al. | |
| 6,524,224 B2 | 2/2003 | Gagnon et al. | |
| 6,564,663 B2 | 5/2003 | Rioux et al. | |
| 6,569,057 B2 | 5/2003 | Jones et al. | |
| 6,896,112 B2 | 5/2005 | Berger et al. | |
| 6,910,987 B2 | 6/2005 | Richards | |
| 6,931,839 B2 | 8/2005 | Foster | |
| 7,000,717 B2 | 2/2006 | Ai et al. | |
| 2004/0014564 A1 * | 1/2004 | Jager et al. | 477/115 |

FOREIGN PATENT DOCUMENTS

| | | |
|---|---|---|
| DE | 37 31 259 A1 | 4/1988 |
| EP | 0 385 629 | 9/1990 |
| EP | 0 638 454 A1 | 2/1995 |
| EP | 0 742 386 A2 | 11/1996 |
| JP | 2001-146930 | 5/2001 |
| JP | 2001-173685 | 6/2001 |

OTHER PUBLICATIONS

European Search Report; Jun. 12, 2008; 6 pages.

* cited by examiner

Primary Examiner—Richard M. Lorence
(74) Attorney, Agent, or Firm—Knobbe, Martens, Olson & Bear, LLP

(57) ABSTRACT

Engagement of a clutch is at least partially controlled based upon the difference in rotational speed between the drive side of the clutch and the driven side of the clutch. As the rotational speed difference varies, the approach rate of the drive side and the driven side also varies for at least part of the total distance defined between the drive side and the driven side when the clutch is disengaged.

19 Claims, 11 Drawing Sheets

STRADDLE-TYPE VEHICLE HAVING CLUTCH ENGAGEMENT CONTROL DEVICE AND METHOD OF USING CLUTCH ENGAGEMENT CONTROL DEVICE

RELATED APPLICATIONS

The present application claims the priority benefit of Japanese Patent Application No. 2004-359224, filed on Dec. 10, 2004, which is hereby incorporated by reference in its entirety.

The present application hereby incorporates by reference the following copending United States Patent Applications: (1) application Ser. No. 11/301,282, filed on even date herewith, which is entitled STRADDLE-TYPE VEHICLE HAVING CLUTCH CONTROL DEVICE AND METHOD OF USING CLUTCH CONTROL DEVICE and which has; (2) application Ser. No. 11/301,646, filed on even date herewith, which is entitled CLUTCH ACTUATOR FOR STRADDLE-TYPE VEHICLE and; which has; (3) application Ser. No. 11/299,720, filed on even date herewith, which is entitled APPARATUS AND METHOD FOR CONTROLLING TRANSMISSION OF STRADDLE-TYPE VEHICLE and which has; and (4) application Ser. No. 11/299,858, filed on even date herewith, which is entitled GEAR CHANGE CONTROL DEVICE AND METHOD and which has. The contents of all of the above-noted copending U.S. patent applications are hereby incorporated by reference in their entireties.

BACKGROUND OF THE INVENTION

1. Field of the Invention

The present invention generally relates to a device and method that control the engagement speed of a clutch. More particularly, the present invention relates to such a device and method as they are employed on a straddle-type vehicle.

2. Description of the Related Art

Vehicles can have any of a number of different transmission types. Three types of shiftable transmissions are a manual transmission, a semi-automatic transmission in which clutch manipulation by a rider is not required for shifting and an automatic transmission. These types of transmissions generally comprise a clutch.

As is known, a clutch generally is used to interrupt the flow of power from an engine output to a transmission input. As such, the clutch typically comprises a drive member on the engine side and a driven member on the output side. When the driven member and the drive member are brought together, the clutch is considered engaged. When the driven member and the drive member are separated, the clutch is considered disengaged. The clutch typically is engaged and disengaged with an engagement device that uses a clutch actuator to bring the drive member and the driven member into engagement.

Some clutch engagement devices feature two or three different speeds at which the clutch is engaged in order to improve the feel of the engagement action while shortening the time for engagement to occur. For example, if the clutch is moving from a disengaged state to a semi-engaged state, engagement may occur rapidly by forcing the drive side and the driven side of the clutch together at a high speed. Once the clutch has become semi-engaged, the clutch engagement proceeds at a low speed from semi-engagement to engagement until a clutch rotating speed difference becomes less than or equal to a predetermined value. The low speed movement from the semi-engaged state to the engaged state reduces an impact between the drive side and the driven side, which reduction results in a more comfortable operation for the rider.

To shorten the time required to achieve engagement, some clutches, once semi-engaged, continue to bring the drive-side and the driven-side together at a high speed once a clutch rotating speed difference becomes less than or equal to the predetermined value. Such configurations can be found, for instance, in JP-A-2001-146930 and JP-A-2001-173685.

While such constructions bring the drive member and the driven member together at different speeds during the range of movement, these speeds do not vary based upon the difference in rotational speeds of the drive member and the driven member (i.e., a clutch rotating speed difference). For instance, while the clutch rotating speed difference gradually varies over time during engagement of the clutch, two or three preset clutch engagement speeds are maintained until a clutch rotating speed difference becomes less than or equal to a predetermined value without adjusting the clutch engagement speed according to the difference in the rotational speeds of the two members.

Therefore, conventional clutch connection devices do not respond in different ways to different operational demands. The drive member and the driven member are brought together at the same two or three speeds regardless of the operating conditions. For example, quick braking and/or quick throttle operation of a vehicle by a rider while engaging the clutch is treated the same as an ordinary clutch engagement.

SUMMARY OF THE INVENTION

Accordingly, one aspect of the present invention involves a clutch connection control device for engagement and disengagement of a clutch. The engagement and disengagement are performed by a clutch actuator. The device comprises a clutch rotating speed difference detecting means that detects a difference in rotating speed between a drive side and a driven side of the clutch. The clutch engagement speed varying means varies a clutch engagement speed according to variation in the clutch rotating speed difference detected by the clutch rotating speed difference detecting means. The clutch connecting means causes the drive side and the driven side of the clutch to approach each other at the clutch engagement speed varied by the clutch engagement speed varying means.

Another aspect of the present invention involves a clutch engagement control method for engagement and disengagement of a clutch using a mechanical clutch actuator. The method comprises detecting a clutch rotating speed difference, which is a difference between a rotating speed of a drive side of the clutch and a rotating speed of a driven side of the clutch, varying a clutch engagement speed according to the detected clutch rotating speed difference, and moving the drive side and the driven side of the clutch toward each other at the varied clutch engagement speed.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

Figure 1:
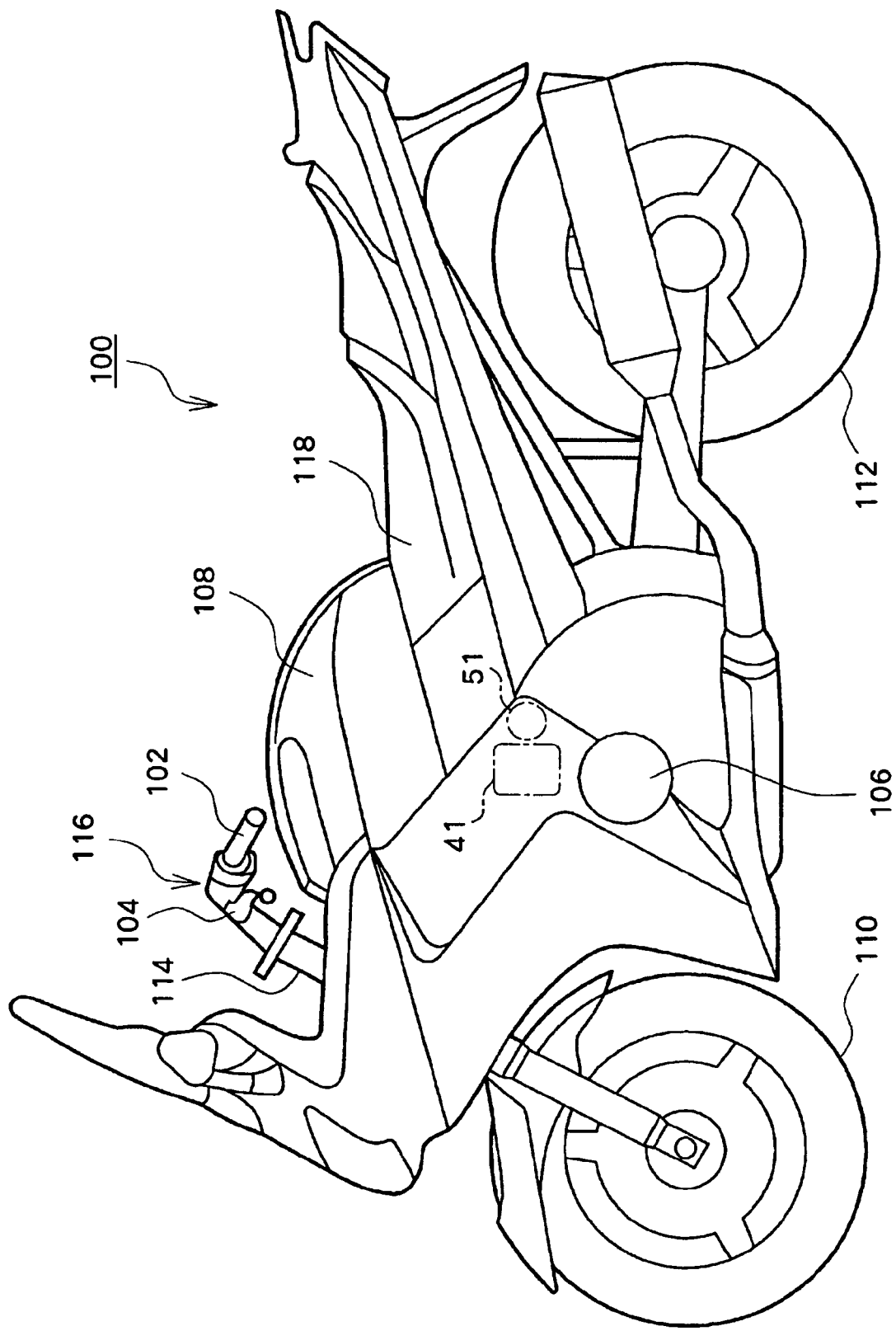
FIG. 1 is a side view of a straddle-type vehicle that is arranged and configured in accordance with certain features, aspects and advantages of the present invention.

With reference now to FIG. 1, a straddle-type vehicle is illustrated that has been arranged and configured in accordance with certain features, aspects and advantages of the present invention. In the illustrated configuration, the straddle-type vehicle is a motorcycle 100. In other configurations, the straddle-type vehicles can comprise, for example but without limitation, motorcycles, motorized bicycles, scooters, three-wheeled and four-wheeled buggies such as all terrain vehicles, snowmobiles and the like.

The illustrated motorcycle 100 comprises a front wheel 110 and a rear wheel 112. A front fork 114 is connected to the front wheel 112. A handle 116 extends laterally across the motorcycle 100 and is connected to a top of the front fork 114. The handle 116 comprises a grip 102 and a clutch lever 104 that are mounted at a first end and an accelerator grip and a brake lever (not shown) that are mounted at a second end.

The motorcycle 100 comprises an engine 106 and a fuel tank 108 that is positioned generally vertically above the engine 106. The motorcycle further comprises a seat 118 that is provided on an upper portion of the motorcycle 100 at a location rearward of the fuel tank 108 in the illustrated configuration. A rider can ride the motorcycle 100 while straddling the seat 118.

Figure 2:
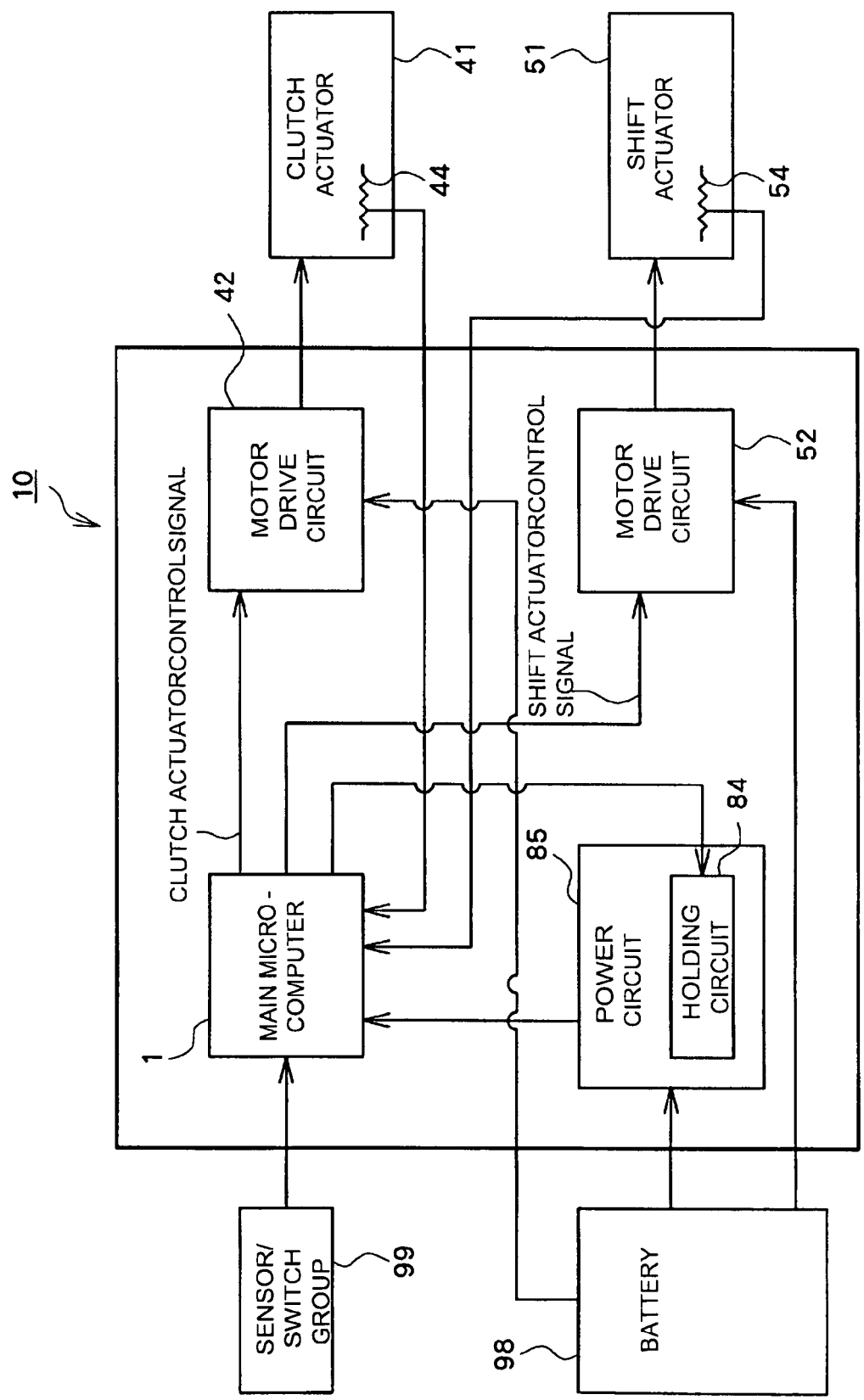
FIG. 2 is a schematic overview of a control system that comprises a control device arranged and configured in accordance with certain features, aspects and advantages of present invention.

With reference now to FIG. 2, the motorcycle 100 comprises a control device 10. The control device 10 preferably comprises a main microcomputer 1. The main microcomputer 1 can have any suitable configuration. In other words, the main microcomputer 1 can be a specially designed component or can be a standard component that operates specially prepared programs or code to accomplish the features, aspects and advantages of the present invention that are desired in any particular application. Other suitable microprocessors and components can be used in place of or together with the microcomputer 1.

Figure 3:
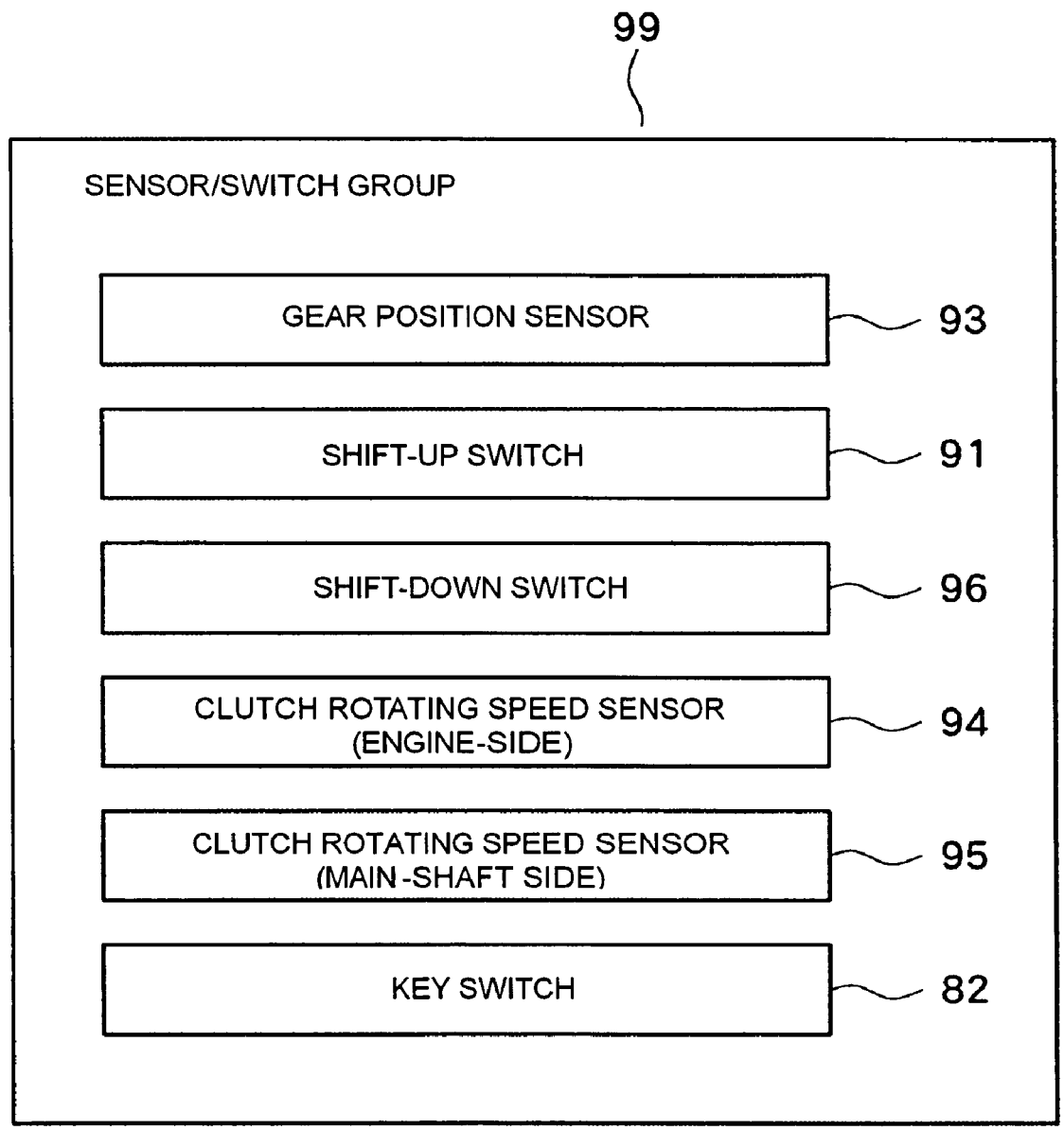
FIG. 3 is a schematic view representing a sensor/switch group that can be connected to the control device of FIG. 2.

The main microcomputer, in the illustrated configuration, receives input information from, among other components, a sensor/switch group 99. With reference now to FIG. 3, the illustrated sensor/switch group comprises an up-shift sensor 91 and a down-shift sensor 96. As will be explained, the up-shift sensor 91 and the down-shift sensor 96 can be used to input requests from the rider to adjust the gearing of the transmission.

In addition, the sensor/switch group 99 comprises a gear position sensor 93. The gear position sensor 93 inputs information to the main microcomputer 1 regarding whether the transmission is in gear and/or the gearing currently used by the transmission. The gear position sensor 93 can be mounted to the transmission. In some embodiments, the gear position sensor 93 can input into the main microcomputer 1 a voltage value corresponding to a turning angle of a shift cam shaft as gear position information. Other suitable configurations also can be used.

The sensor/switch group 99 also preferably comprises two sensors that can be used to determine a clutch rotating speed difference. As can be appreciated, when the clutch is disengaged or semi-engaged, the drive side of the clutch and the driven side of the clutch will be rotating at different speeds. In the illustrated embodiment, the main microcomputer receives input information from a first clutch rotating speed sensor (e.g., an engine-side clutch rotating speed sensor) 94, which can be mounted to a member on an engine-side of the clutch. The main microcomputer 1 also receives input from a second clutch rotating speed sensor (e.g., a main-shaft/transmission side clutch rotating speed sensor) 95, which can be mounted to a member on a main-shaft/transmission side of the clutch. The first clutch rotating speed sensor 94 preferably detects the rotating speed of a member on the engine-side of the clutch and the second clutch rotating speed sensor 95 preferably detects a rotating speed of a member on the main-shaft/transmission side of the clutch. A rotating speed of the member on the engine-side of the clutch also may be detected on the basis of, for example, the frequency emitted from a crank pulse sensor mounted to a crank of the engine. A rotating speed of the member on the main-shaft side of the clutch also may be detected by calculation based on a vehicle speed and a gear reduction ratio. Any other suitable configurations also can be used to detect either or both speeds. The detected speeds can be input into the main microcomputer 1 respectively as engine-side clutch rotating speed information and as transmission-side clutch rotating speed information. In some configurations, the detected speeds can be used to calculate the difference in speeds, which is then input into the main microcomputer 1.

The illustrated sensor/switch group 99 further comprises a key switch 82. The key switch 82 preferably utilizes a key of the motorcycle and is moved to the ON position by rotation of the key of the motorcycle. Other suitable configurations can be used.

While the above-identified sensors can be used, other sensors also can be used. In addition, while the illustrated sensors preferably directly detect the states of the associated components, the sensors also can comprise so-called pseudo sensors that indirectly detect the states of the components desired to be sensed.

With reference again to FIG. 2, a battery is connected to the control device 10. The battery 10 can supply power to the main microcomputer 1. In the illustrated embodiment, the battery 10 supplies power to the main microcomputer 1 through a power circuit 85. The power circuit 85 can transform the voltage of the battery 10 into a useable voltage for the main microcomputer 1.

The power circuit 85 preferably comprises a switch (not shown) that is switched to an ON position when the key switch 82 is moved to the ON position. When the switch is moved to the ON position by actuation of the key switch 82, a signal (e.g., a switch-ON signal) can be output to the main microcomputer 1.

The power circuit 85 also preferably comprises a holding circuit 84. The holding circuit 84 is adapted to briefly continue the supply of power from the battery 98 to the main microcomputer 1 following the key switch 82 being moved to the OFF position. In one configuration, when the key switch 82 is moved to the OFF position, the power circuit switch preferably is temporarily held in the ON position by the holding circuit 84. The power circuit 84 therefore can continue to supply voltage to the main microcomputer 1 such that the main microcomputer can complete any desired shutdown operations. When the shutdown operations have been completed by the main microcomputer 1, the supply of electric power to the main microcomputer 1 from the power circuit 85 ceases.

Figure 4:
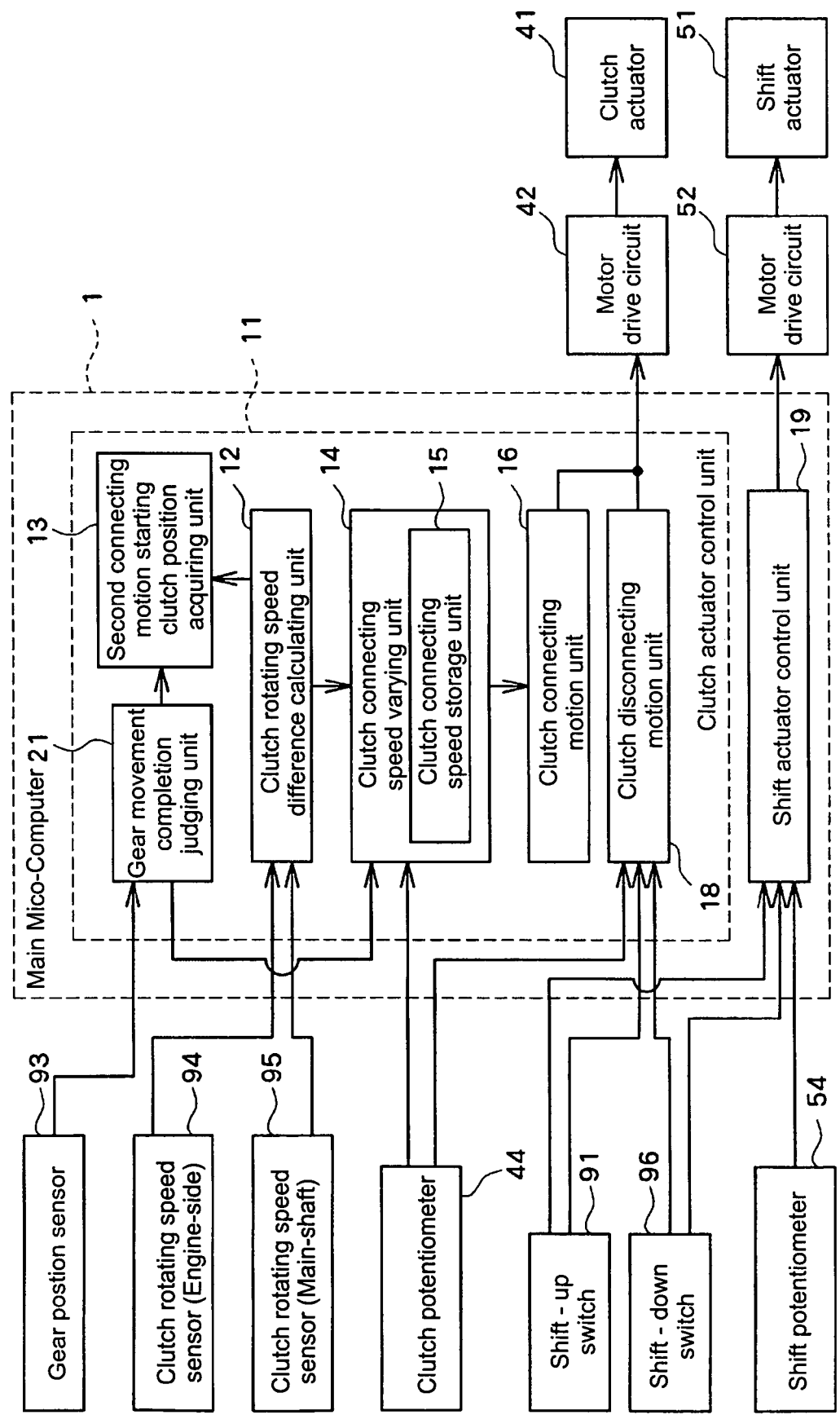
FIG. 4 is a schematic view of a portion of a main microcomputer that can be used in embodiments arranged and configured in accordance with certain features, aspects and advantages of the present invention.

The illustrated control device 10 preferably uses the main microcomputer 1 to control operation of a clutch actuator 41 and operation of a shift actuator 51. As shown in FIG. 4, the main microcomputer 1 preferably comprises a clutch actuator control unit 11 and a shift actuator control unit 19. Thus, the clutch actuator 41 and the shift actuator 51 can be controlled based upon information that indicates the operational state of the vehicle. In one configuration, the information can be input from the sensor/switch groups 99, the clutch actuator 41 itself (i.e., a clutch potentiometer 44), and the shift actuator 51 itself (i.e., a shift potentiometer 54). The clutch actuator control unit 11 and the shift actuator control unit 19 output signals respectively to a clutch motor drive circuit 42 and a shift motor drive circuit 52.

The clutch motor drive circuit 42 supplies electric power that drives a clutch actuator 41. The illustrated control device also comprises a shift motor drive circuit 52. The shift motor drive circuit 52 supplies electric power that drives a shift actuator 51.

In one configuration, the clutch motor drive circuit 42 comprises a known H bridge circuit. The clutch motor drive circuit 42 feeds electric current from the battery 98 to a dc motor of the preferred clutch actuator 41. The current is delivered to rotate the dc motor in the direction and at the speed corresponding to the clutch actuator drive signal supplied from the main microcomputer 1.

Similarly, in one configuration, the shift motor drive circuit 52 comprises a known H bridge circuit. The shift motor drive circuit 52 feeds electric current from the battery 98 to a dc motor of the preferred shift actuator 51. The current is delivered to rotate the dc motor in the direction and at the speed corresponding to the shift actuator drive signal supplied from the main microcomputer 1.

In the preferred configuration, the motorcycle 100 comprises a single clutch and torque is transferred between the engine 106 and a suitable transmission by the action of the single clutch. The engagement and disengagement of the clutch advantageously are performed by a drive force, such as that supplied by electric power rather than, or in addition to, that provided by human power. Thus, the motorcycle 100 preferably also comprises the clutch actuator 41, which is controlled by the control device 10 (see FIG. 2).

The clutch actuator 41 preferably uses a motor to operate a clutch that is provided in a crankcase of the engine 106. In one preferred configuration, the clutch actuator 41 comprises a direct current (dc) motor. Other suitable types of motors or linear actuators also can be used. In the preferred configuration, forward rotation of the dc motor can disengage the clutch while reverse rotation of the dc motor can engage the clutch or put the clutch in a desired position between the disengaged state and the engaged state. Other suitable arrangements also can be used.

The clutch actuator 41 can be mounted above the engine 106. In a preferred configuration, the clutch actuator 41 is mounted in a region above the engine 106 and below the fuel tank 108. The clutch lever 104 can be connected to the clutch actuator 41 by a length of wire so that engagement and disengagement of the clutch also can be performed by the operator of the vehicle by manipulating the clutch lever 104.

A clutch potentiometer 44 preferably is mounted to the clutch actuator 41. The clutch potentiometer 44 can comprise a resistor and other suitable electrical components such that a voltage indicative of an operational state of the clutch actuator 41 (e.g., a voltage indicative of the clutch position) can be supplied to the control device 10. Any suitable configuration can be used that supplies information regarding the clutch position to the control device 10.

The motorcycle 100 preferably also comprises the shift actuator 51. In one configuration, the shift actuator 51 comprises a motor that operates a transmission provided in a transmission casing of the engine 106. The shift actuator 51 preferably comprises a dc motor (not shown). Other suitable types of motors or linear actuators also can be used.

The shift actuator 51 also can be controlled by the control device 10. Preferably, the shift actuator 51 is mounted to a shift arm of the transmission. In the illustrated configuration, forward rotation of the motor can cause up-shifting of the transmission and reverse rotation of the motor can cause down-shifting of the transmission. Other configurations are possible. The transmission can feature a shift dog or any other suitable shifting configuration that is connected to the shift arm. In one configuration, the transmission is shiftable among neutral and multiple forward speeds. Preferably, the transmission is shiftable among neutral and five forward speeds.

A shift potentiometer 54 preferably is mounted to the shift actuator 51. The shift potentiometer 54 can comprise a resistor and other suitable electrical components such that voltage indicative of an operational state of the shift actuator 51 (e.g., a voltage indicative of the shift actuator/shift lever position) can be supplied to the control device 10. Any suitable configuration can be used that supplies information regarding either or both of the shift actuator position and shift lever position. In the preferred embodiment, the voltage value is indicative of the turning angle or position of the shift arm.

The shift actuator control unit 19 turns the shift actuator 51 from a reference angle to a maximum angle after a predetermined period, described later, when a gear change is instructed by a rider. The shift cam shaft rotates when the shift actuator 51 turns such that the gear engaged by a shift fork is moved. While the shift cam shaft rotates when the shift actuator 51 turns in the course of a shift motion, the shift cam shaft preferably does not remain joined to the shift actuator 51 when the shift actuator 51 returns to the reference angle. The shift cam shaft, therefore, remains in position when the shift actuator 51 is reset and awaiting the next shift command.

As used herein, the reference angle preferably is a neutral position in which the shift actuator 51 is not turned in either an up-shift direction or in a down-shift direction. Also, the maximum angle preferably is a position that is necessary and sufficient to cause a single up-shift or down-shift.

Preferably, the shift actuator control unit 19 receives input from the shift potentiometer 54. As explained above, the shift potentiometer 54 outputs a voltage that is indicative of the shift actuator/shift lever position. Based upon the output of the shift potentiometer 54, for instance, the shift actuator control unit 19 can stop the movement of the shift cam shaft when the shift actuator 51 has turned a sufficient amount to shift gears.

With reference again to FIG. 4, the clutch actuator control unit 11 preferably comprises a clutch disengagement motion unit 18, a clutch engagement motion unit 16, a clutch engagement speed varying unit 14, a clutch rotating speed difference calculating unit 12, a gear movement completion judging unit 21, and a second engagement motion starting clutch position acquiring unit 13.

The clutch disengagement motion unit 18 and the clutch engagement motion unit 16 provide control signals that are used to control the clutch actuator 41. The clutch disengagement motion unit 18 operates the clutch actuator 41 to cause the clutch to transition from the engaged state to the completely disengaged state (i.e., a clutch disengagement motion). Similarly, the clutch engagement motion unit 16 operates the clutch actuator to cause the clutch to transition from the disengaged state to the semi-engage or fully engaged state or from the semi-engaged state to the fully engaged state.

The clutch disengagement motion unit 18 operates the clutch actuator 41 if, for example, gear change instructing information has been input from the up-shift switch 91 or the down-shift switch 96. In the course of the clutch disengagement motion, the clutch disengagement motion unit 18 acquires clutch position information from the clutch potentiometer 44 to judge whether the clutch has reached the completely disengaged state. When the clutch reaches the completely disengaged state, the clutch disengagement motion unit 18 stops movement of the clutch actuator 41.

The gear movement completion judging unit 21 acquires gear position information from the gear position sensor 93. After the clutch starts the disengagement motion, the gear position is monitored on the basis of the gear position information and it is judged whether the gear shift has been completed. If the selected gear combination is engaged, it is judged that the gear movement has been completed. In the illustrated configuration, once it is judged that the gear movement has been completed, the clutch rotating speed difference calculating unit 12 communicates the clutch rotating speed difference to the clutch engagement speed varying unit 14 and to the second engagement motion starting clutch position acquiring unit 13.

In one configuration, the clutch rotating speed difference calculating unit 12 acquires the clutch rotating speed difference, which is the difference in rotating speed between the drive side and the driven side of the clutch. Preferably, the clutch rotating speed difference calculating unit 12 acquires clutch rotating speed information from the first clutch rotating speed sensor 94 and from the second clutch rotating speed sensor 95 and calculates a difference between the rotating speeds to arrive at the clutch rotating speed difference information. Other techniques also can be used to arrive at the clutch rotating speed difference or a pseudo-value that indicates output that can be used for the same purpose as the clutch rotating speed difference.

The second engagement motion starting clutch position acquiring unit 13 comprises a pre-stored second engagement motion starting clutch position map, in which a second engagement motion starting clutch position and a clutch rotating speed difference correspond to each other. In the second engagement motion starting clutch position map, a second engagement motion starting clutch position is set between a completely disengaged state and a completely engaged state of the clutch.

Figure 5:
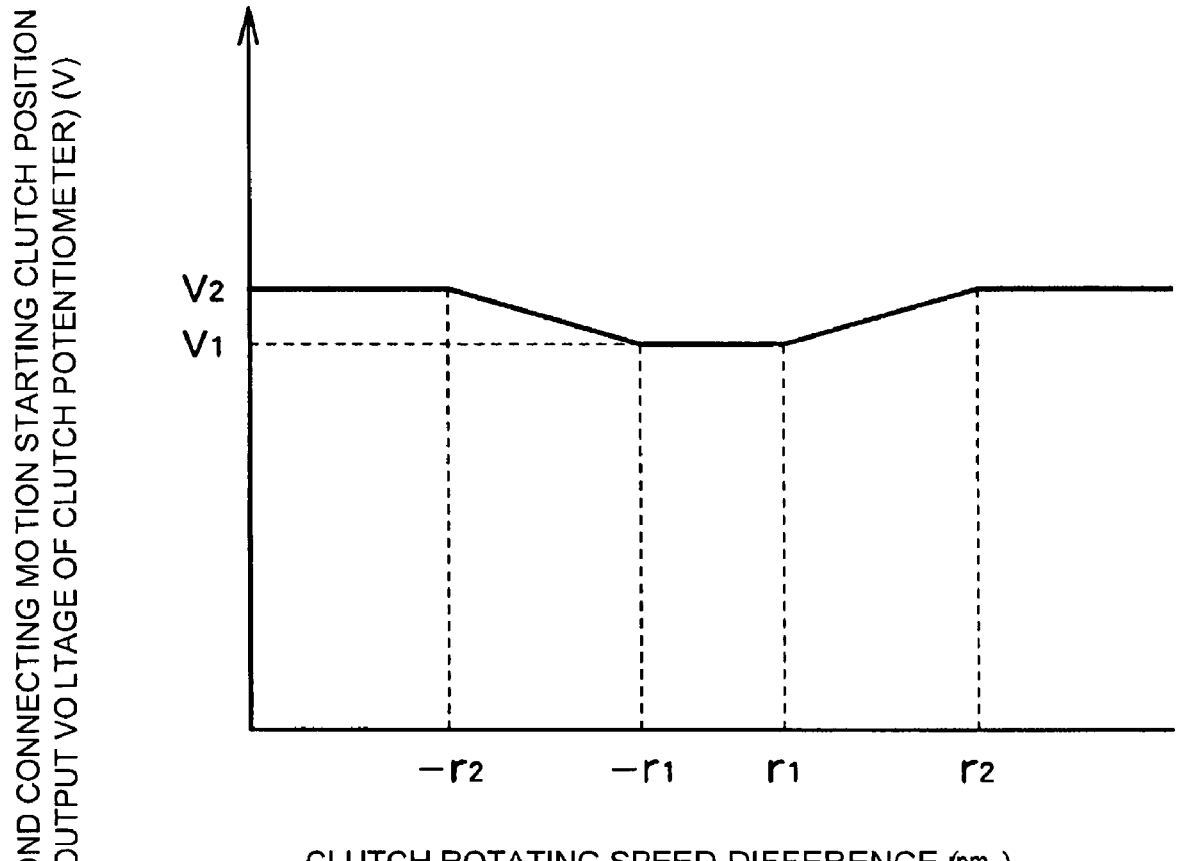
FIG. 5 is a graphical depiction of a second engagement motion starting clutch position map.

FIG. 5 shows an example of a second engagement motion starting clutch position map. In the illustrated configuration, the abscissa indicates a clutch rotating speed difference obtained by subtracting a main-shaft side clutch rotating speed from an engine-side clutch rotating speed. The ordinate indicates a second engagement motion starting clutch position. Any suitable manner of creating a relationship between the speed differences and the clutch positions can be used.

As shown in the figure, a second engagement motion starting clutch position assumes a generally constant value (v1 in the figure) between about 0 rpm and a predetermined absolute value of a rotating speed difference r1. The second engagement motion starting clutch position increases in proportion to the absolute value of the rotating speed difference between r1 to a predetermined absolute value of a rotating speed difference r2, which is larger than r1. The second engagement motion starting clutch position assumes a second generally constant value (v2 in the figure) at absolute values of rotating speed differences that are greater than or equal to a predetermined absolute value of a rotating speed difference r2. Thus, in the mid-range between r1 and r2, the starting clutch position increases in proportion to the magnitude of the clutch rotating speed difference. If the clutch rotating speed difference is large, the second engagement motion is started earlier than if the clutch rotating speed difference is small. By doing this, more rapid and smooth clutch engagement can be accomplished.

Thus, the second engagement motion starting clutch position acquiring unit 13 determines from the second engagement motion starting clutch position map the second engagement motion starting clutch position on the basis of the reported clutch rotating speed difference. The second engagement motion starting clutch position is communicated to the clutch engagement speed varying unit 14 by the second engagement motion starting clutch position acquiring unit 13.

The clutch engagement motion unit 16 operates the clutch actuator 41 on the basis of the engagement speed communicated from the clutch engagement speed varying unit 14. If the clutch engagement speed varying unit 14 stops communication of the engagement speed, movement of the clutch actuator 41 also is stopped. Acquisition of the second engagement speed is performed on the basis of one or more pre-stored second engagement speed maps, which can be contained in a clutch engagement speed storage unit 15. The second engagement speed maps preferably correlate the clutch rotating speed and the desired second engagement speed. Any other suitable technique for establishing the correlated values can be used. For instance, the second engagement speed corresponding to the acquired clutch rotating speed difference can be found by pre-storing one or more formulas indicative of the relationship between a clutch rotating speed difference and a second engagement speed. Thus, simple calculations can be conducting using the formulas.

The clutch engagement speed storage unit 15 preferably forms a portion of the clutch engagement speed varying unit 14. In one embodiment, a first map is provided for up-shifting operations (see FIG. 6) and a second map is provided for down-shifting operations (see FIG. 7). By providing maps for both operations, it is possible to simplify calculations such that the clutch engagement speed varying unit 14 can acquire the desired second engagement speed in a shorter time. In another embodiment, all of the data for both up-shifting and down-shifting is contained in a single map. More preferably, the maps preferably comprise data for each possible gear change. The data, of course, preferably correlates the clutch rotating speed to the desired second engagement speed. Thus, it is possible to more rapidly acquire the desired clutch engagement speed for each gear shift combination.

In one configuration, the second engagement speed maps preferably are constructed such that when the absolute value of the clutch rotating speed difference becomes a value between a predetermined value r1 and a predetermined value r2, which is smaller than r1, the second engagement speed varies as the absolute value of the clutch rotating speed difference decreases. Preferably, in this configuration, the second engagement speed assumes a minimum value at the predetermined value r2. Where the absolute value of the clutch rotating speed difference in this configuration is smaller than the predetermined value r2, the second engagement speed assumes its minimum value irrespective of variation in the absolute value of the clutch rotating speed difference.

Figure 6:
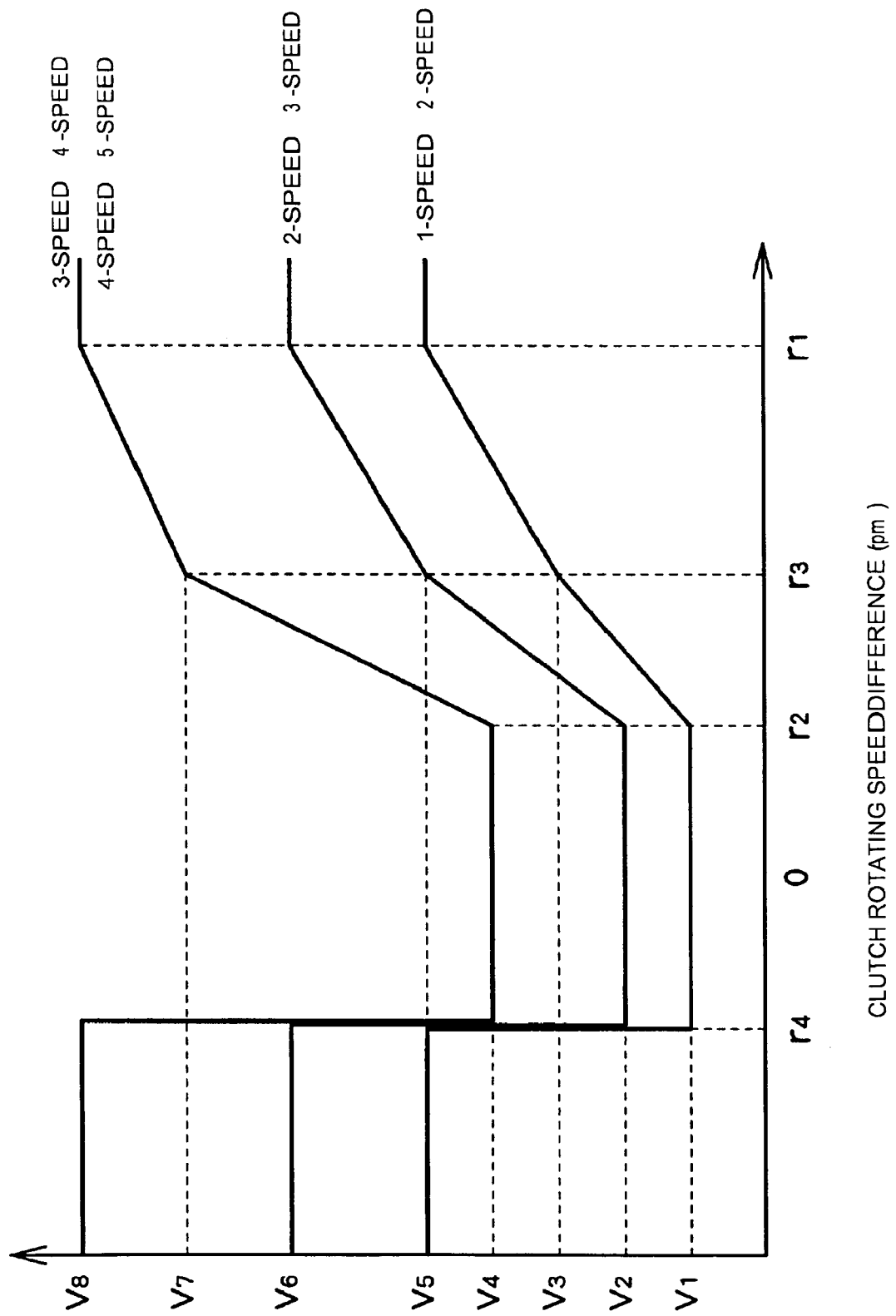
FIG. 6 is a graphical depiction of a second engagement speed map used during an up-shift in some embodiments.

During up-shifting, the up-shifting second engagement speed map, such as that shown in FIG. 6, can be used. Other maps also can be used. As shown, the abscissa indicates the clutch rotating speed difference and the ordinate indicates a rotating speed of the clutch actuator 41 that corresponds to the second engagement speed.

As shown in FIG. 6, up to eight different clutch engagement speeds can be used. More engagement speeds or less engagement speeds can be used in other configurations. If the clutch rotating speed difference is between the predetermined rotating speed difference r1 to the predetermined rotating speed difference r2, which is smaller than r1, the second engagement speed will decrease as the clutch rotating speed difference decreases. The rate at which the clutch engagement speed decreases begins to increase at the predetermined rotating speed difference r3, which is between the predetermined rotating speed differences r1 and r2. If the clutch rotating speed difference is between the predetermined rotating speed difference r2 to another predetermined rotating speed difference r4, which is smaller than r2, the clutch engagement speed preferably is a generally constant value (V1 or V2 or V4 in the figure). Also, if during an up-shift an abnormality occurs in the operation of the engine or in the driving of the vehicle such that the driven member of the clutch is rotating faster than the drive member of the clutch (i.e., the clutch rotating speed difference becomes equal to or less than the predetermined rotating speed difference r4), then the clutch engagement speed becomes a constant level (V5 or V6 or V8 in the figure) that is higher than when the clutch rotating speed difference is in the range from the predetermined rotating speed difference r2 to r4.

Figure 7:
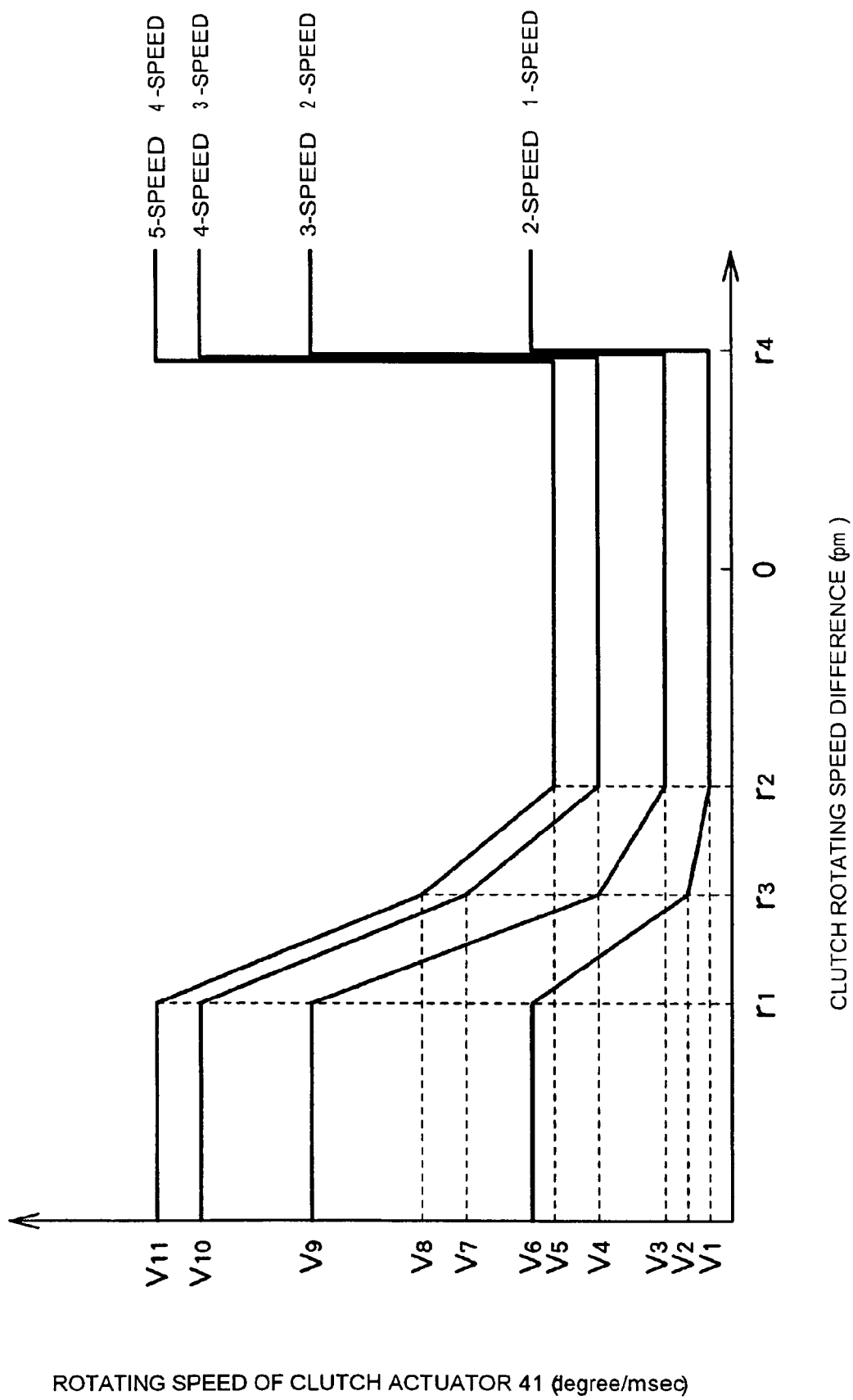
FIG. 7 is a graphical depiction of a second engagement speed map used during a down-shift in some embodiments.

With reference now to FIG. 7, an example of the second engagement speed map used during downshifting is shown therein. As illustrated, the abscissa comprises the clutch rotating speed difference and the ordinate comprises the rotating speed of the clutch actuator 41 that corresponds to the second engagement speed.

As shown, during a down-shift, if the clutch rotating speed difference is in the range from the predetermined rotating speed difference r1 to another predetermined rotating speed difference r2, the absolute value of which is set to be smaller than the absolute value of r1, the second engagement speed decreases as the clutch rotating speed difference moves from r1 toward r2. The curves illustrate that the rate of the clutch engagement speed decreases at a first rate over the range between r1 and r3 and at a faster rate over the range between r3 and r2. If the clutch rotating speed difference is in the range between the predetermined rotating speed difference r2 to another predetermined rotating speed difference r4, which is smaller than r2, the clutch engagement speed is generally constant (e.g., V1, V3, V4, or V5 in the figure). If there is an abnormality in the operation of the engine or the driving of the vehicle such that the drive member of the clutch rotates faster than the driven member, and the clutch rotating speed difference becomes less than or equal to the predetermined rotating speed difference r4, the speed is set such that engagement of the clutch will be performed at a higher speed than if the clutch rotating speed difference is in the range defined between the predetermined rotating speed differences r2 and r4.

With reference to FIGS. 6 and 7, the second engagement speed maps preferably are prepared for each gear change, whether it is an up-shift or a down-shift. In making a comparison among clutch engagement speeds for each gear ratio change in terms of the same clutch rotating speed difference, the second engagement speed in the higher gears is greater than or equal to the engagement speed in the lower gears. For example, as shown in FIGS. 6 and 7, with the same clutch rotating speed difference, the clutch engagement speed when the transmission shifts from $4^{th}$ gear to $5^{th}$ gear is generally the same as or faster than the clutch engagement speed when the transmission shifts from $3^{rd}$ gear to $4^{th}$ gear. Similarly, the clutch engagement speed when the transmission shifts from $3^{rd}$ gear to $4^{th}$ gear is generally the same as or faster than the clutch engagement speed when the transmission shifts from $1^{st}$ gear to $2^{nd}$ gear. Such an arrangement improves the feel of the gear change in all ratio changes.

The clutch engagement speed varying unit 14 acquires from the map the second engagement speed that corresponds to the clutch rotating speed difference acquired from the clutch rotating speed difference calculating unit 12. The second engagement speed thus acquired is communicated to the clutch engagement motion unit 16 and the clutch actuator 41 can start the second engagement motion. Over the course of the second engagement motion, the second engagement speed advantageously is repeatedly varied at predetermined intervals. That is, the clutch engagement speed varying unit 14 periodically acquires (e.g., every 1 msec) from the clutch rotating speed difference calculating unit 12 the most current clutch rotating speed difference information.

While the clutch rotating speed difference can be found periodically, such as every 1 msec, other configurations are possible. For instance, it suffices to be performed at other generally short intervals relative to the period of time required for engagement of the clutch. A smooth engagement motion of the clutch is realized even within, for example, a short period of time in the order of several milliseconds. In addition, in some configurations, the clutch rotating speed difference may be detected once every one engine cycle. Moreover, if the clutch rotating speed difference can be detected in the same cycle as that used for the control cycle of the clutch actuator 41, otherwise wasteful detection of the clutch rotating speed difference can be eliminated. In other words, if the clutch rotating speed difference is detected in a shorter period than the control cycle of the clutch actuator 41, the clutch rotating speed difference information that is useful for control of the clutch actuator 41 also is generated. Accordingly, by detecting the clutch rotating speed difference in the same cycle as the control cycle of the clutch actuator 41, it is possible to eliminate the generation of clutch rotating speed difference information that is not used for control of the clutch actuator 41, thereby simplifying the control device 10.

Figure 8:
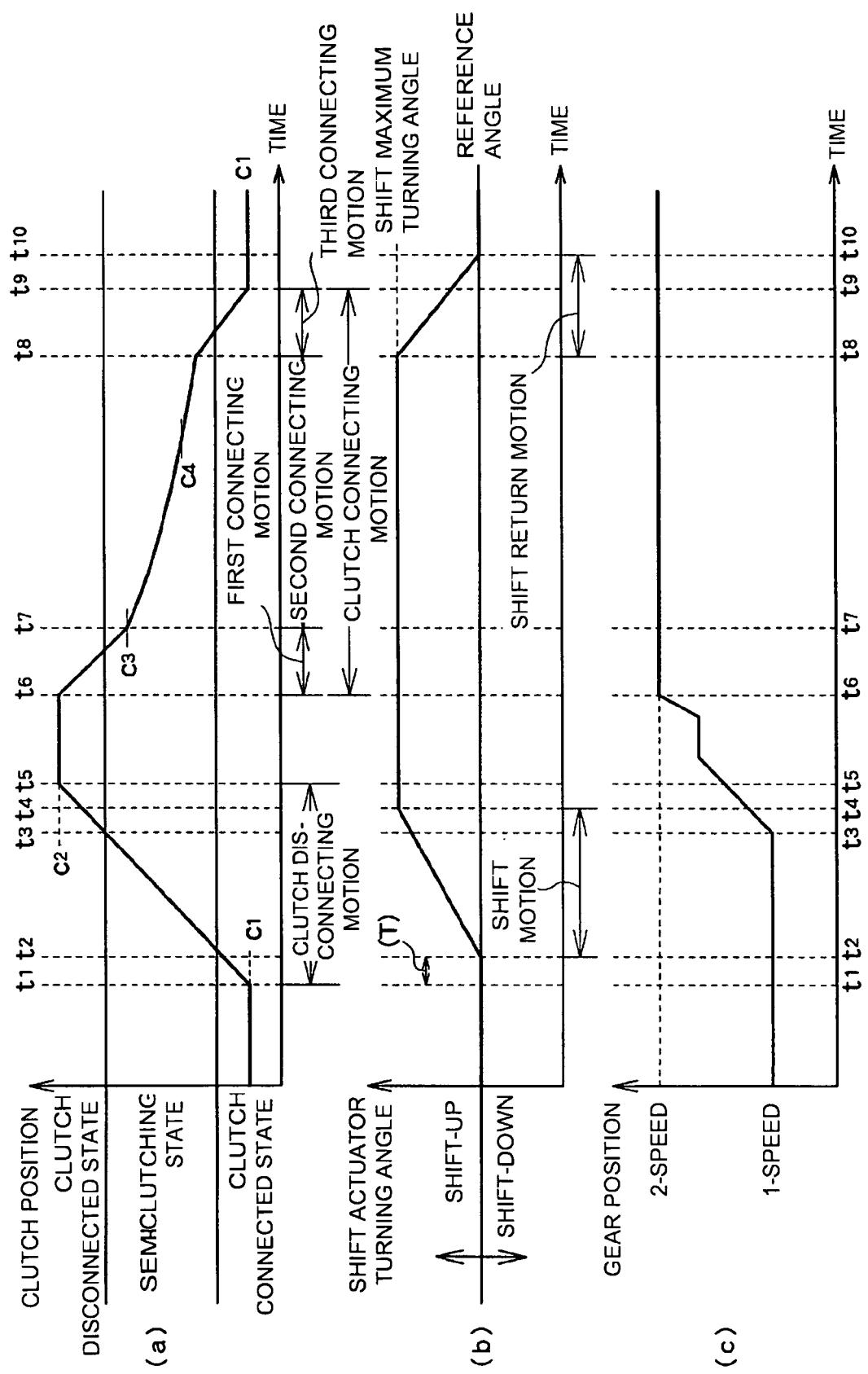
FIG. 8 is a time-based graphical depiction during an up-shift of a clutch position, a turning angle of a shift actuator, and a gear position at the time of up-shift.

With reference now to FIG. 8, the clutch position at the time of up-shift, the turning angle of the shift actuator 51, the gear position, and how these vary over time, of an embodiment of the present invention are shown therein. FIG. 8(a) illustrates the time-variation of the clutch position. FIG. 8(b)

illustrates the time-variation of the turning angle of the shift actuator 51. FIG. 8(*c*) illustrates the time-variation of the gear position.

First, when a rider requests an up-shift by manipulating the up-shift switch 91, the clutch disengagement motion unit 18 starts moving the clutch actuator 41. Thus, the clutch disengagement motion is started (see FIG. 8, t1). In the clutch disengagement motion, the clutch disengagement motion unit 18 judges on the basis of clutch position information when the clutch has reached a completely disengaged state (FIG. 8, clutch position C2). When the clutch reaches the completely disengaged state, the clutch actuator 41 is stopped and the clutch is maintained in the completely disengaged state (see FIG. 8, t5).

After a shift motion lag time (T) has elapsed following the request by the rider, the shift actuator control unit 19 starts moving the shift actuator 51. The lag time T preferably is sufficient to allow the clutch to move from the fully engaged state to the semi-engaged state, which will reduce the forces on gears. Thus, a shifting action is begun (see FIG. 8, t2). When a turning angle of the shift actuator reaches the shift maximum turning angle, the clutch actuator 51 is stopped and the clutch actuator 51 is maintained at the shift maximum turning angle (see FIG. 8, t4). Movement of the clutch actuator 51 causes the shift cam shaft to rotate and a sliding gear begins to move on a spline on a main shaft or a counter shaft (see FIG. 8, t3). During the gear movement, as is shown by the portion that appears as a brief plateau between t5 and t6, the dogs do not typically engage upon contact but typically may grind together prior to interlocking. After the dogs grind together, the sliding gear or the driven-side gear rotates whereby grinding of the dogs diminishes and movement of the sliding gear is complete (see FIG. 8, t6)

Having detected that the gear shift has been completed, the gear movement completion judging unit 21 communicates such detection to the second engagement motion starting clutch position acquiring unit 13 and the clutch engagement speed varying unit 14. The second engagement motion starting clutch position acquiring unit 13 acquires a second engagement motion starting clutch position (see FIG. 8, a clutch position C3) from a clutch rotating speed difference and the second engagement motion starting clutch position is communicated to the clutch engagement speed varying unit 14.

The clutch engagement speed varying unit 14 communicates a first engagement speed to the clutch engagement motion unit 16 once the gear movement is completed and the first engagement motion is started. The first engagement speed is maintained up to the second engagement motion starting clutch position. The clutch engagement speed varying unit 14 monitors the clutch position in the first engagement motion and stops communication of the first engagement speed to the clutch engagement motion unit 16 once it is determined that the second engagement motion starting clutch position is reached (see FIG. 8, t7). The first engagement motion then is terminated.

When the clutch reaches the second engagement motion starting clutch position, the clutch engagement speed varying unit 14 begins to acquire a second engagement speed from the second engagement speed map, and the second engagement speed is communicated to the clutch engagement motion unit 16. Thus, the second engagement motion is started. In the second engagement motion, the second engagement speed is periodically varied on the basis of the second engagement speed map. Hence, the associated line is slightly curved.

Once the clutch position and the clutch rotating speed difference meet the second engagement motion terminating condition, (i.e., the clutch rotating speed difference is less than or equal to the second engagement motion termination enabling rotating speed difference and the clutch position is less than or equal to the second engagement motion termination enabling position—see FIG. 8, a clutch position C4), the clutch engagement speed varying unit 14 stops acquisition of the second engagement speed and begins to communicate the third engagement speed to the clutch engagement motion unit 16. Thus, the second engagement motion is terminated and the third engagement speed is started (see FIG. 8, t8). In the third engagement motion, once it is determined that the clutch has reached the completely engaged state (see FIG. 8, a clutch position C1), the clutch engagement speed varying unit 14 stops communication of the third engagement speed to the clutch engagement motion unit 16 and stops the movement of the clutch actuator 41 (see FIG. 8, t9).

When the second engagement motion is terminated, the clutch engagement speed varying unit 14 communicates the termination of the second engagement motion to the shift actuator control unit 19. After the second engagement motion is terminated, the shift actuator control unit 19 starts a shift return motion to return the shift actuator 51 to the reference angle (see FIG. 8, t8). Once it is determined that the turning angle of the shift actuator 51 has reached the reference angle, the shift actuator control unit 19 stops the movement of the shift actuator 51 (see FIG. 8, t10).

Accordingly, the clutch can be connected at the generally constant first engagement speed, which is faster than the second engagement speed, in the course of the engagement motion until the clutch reaches the second engagement motion starting clutch position, which is somewhere between the completely disengaged state and the completely engaged state of the clutch. After the clutch reaches the second engagement motion starting clutch position, it is engaged at the second engagement speed, which is periodically varied in accordance with the variation in the clutch rotating speed difference. When the clutch rotating speed difference and the clutch position meet the second engagement motion terminating conditions, the clutch is engaged at the third engagement speed, which also is generally constant with time.

Figure 9:
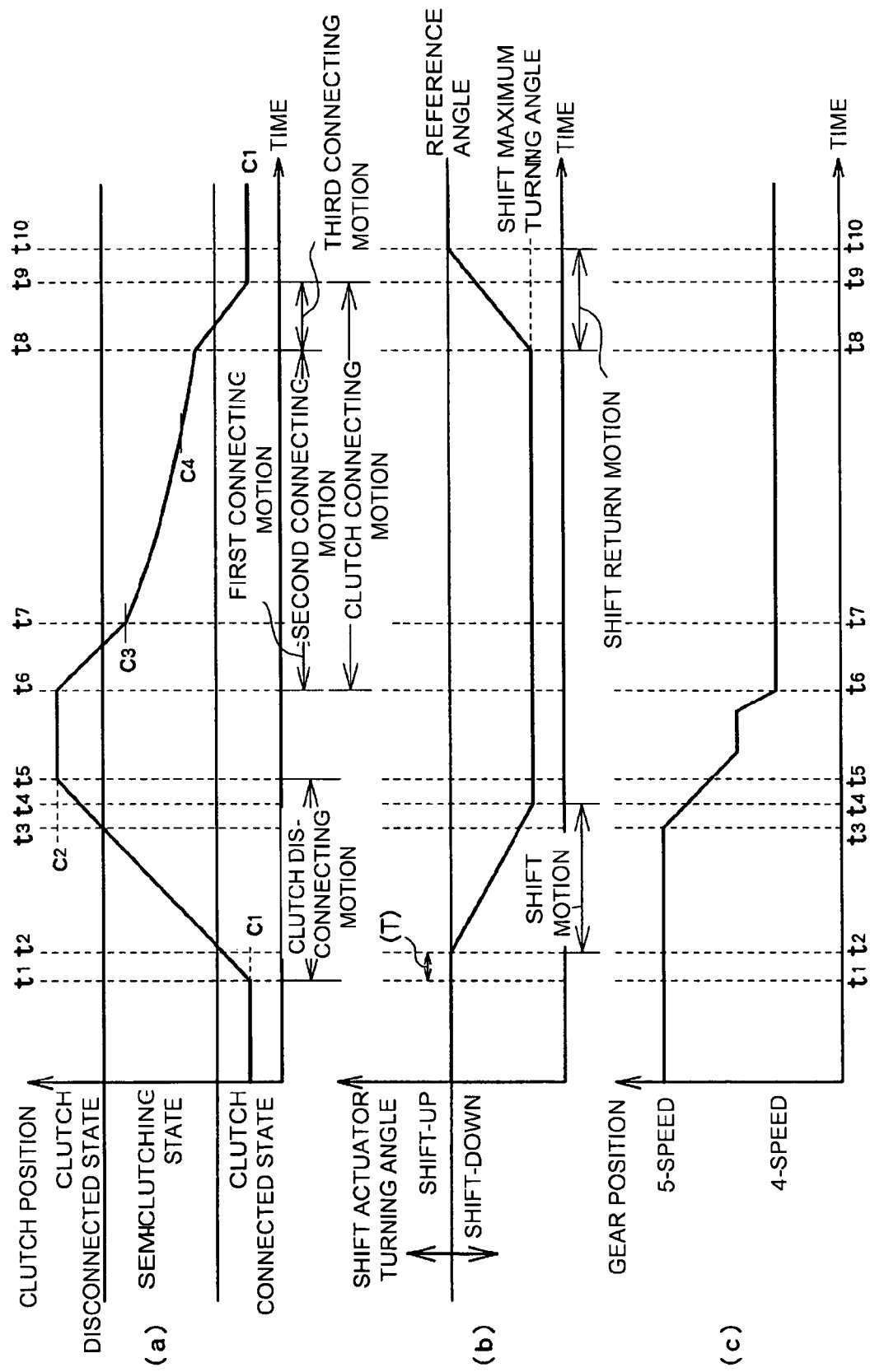
FIG. 9 is a time-based graphical depiction during a down-shift of a clutch position, a turning angle of a shift actuator, and a gear position at the time of down-shift.

FIG. 9 presents a graphical depiction of an embodiment undergoing a down-shift and the time-variation of the clutch position, the turning angle of the shift actuator 51, and the gear position. FIG. 9(*a*) illustrates the time-variation of a clutch position. FIG. 9(*b*) illustrates the time-variation of the turning angle of the shift actuator 51. FIG. 9(*c*) illustrates the time-variation of the gear position.

As illustrated, at the time of a down-shift, after down-shift instructions have been communicated and after the clutch has been disengaged, engagement and disengagement motions of the clutch are performed generally in the order of the first engagement motion, the second engagement motion, and the third engagement motion. In other words, once the down-shift instructions are communicated to the clutch disengagement motion unit 18, disengagement movement of the clutch is started (see FIG. 9, t1). Once the clutch reaches the completely disengaged state and the shifting of the gears has been completed, the engagement motion of the clutch is started (see FIG. 9, t6). The clutch is engaged at a first engagement speed, which is generally constant with time, until the clutch reaches the second engagement motion starting clutch position between the completely disengaged state and the completely engaged state of the clutch (see FIG. 9, t7). After the clutch reaches the second engagement motion starting clutch position, the clutch is engaged at that second engagement speed, which is periodically varied according to variation in the clutch rotating speed difference. When the clutch rotating speed difference and the clutch position meet the second engagement motion terminating conditions, the clutch is engaged at the third engagement speed, which is generally constant with time (see FIG. 9, t8). Once the clutch reaches the completely engaged state, the engagement motion of the clutch is terminated and the clutch is remains in the completely connected state (see FIG. 9, t9).

During downshifting, after the shift motion lag time (T) has elapsed following the downshift instructions, the shift actuator 51 rotates in the opposite direction relative to the direction associated with the up-shift and the shift motion is started (see FIG. 9, t2). After the maximum is reached, the turning angle of the shift actuator 51 is maintained. Once the clutch position and the clutch rotating speed difference meet the second engagement motion terminating conditions, the shift return motion is started (see FIG. 9, t8). Once the turning angle of the shift actuator has reached the reference angle, the shift actuator 51 is stopped (see FIG. 9, t10).

With respect to gear position, the shift actuator 51 begins the shifting movement whereby the sliding gear is urged into movement (see FIG. 9, t3). After the sliding gear begins movement, the sliding gear and the driven-side gear engage with each other following possible grinding of the dogs of the sliding gear and the driven-side gear (see FIG. 9, t6).

Figure 10:
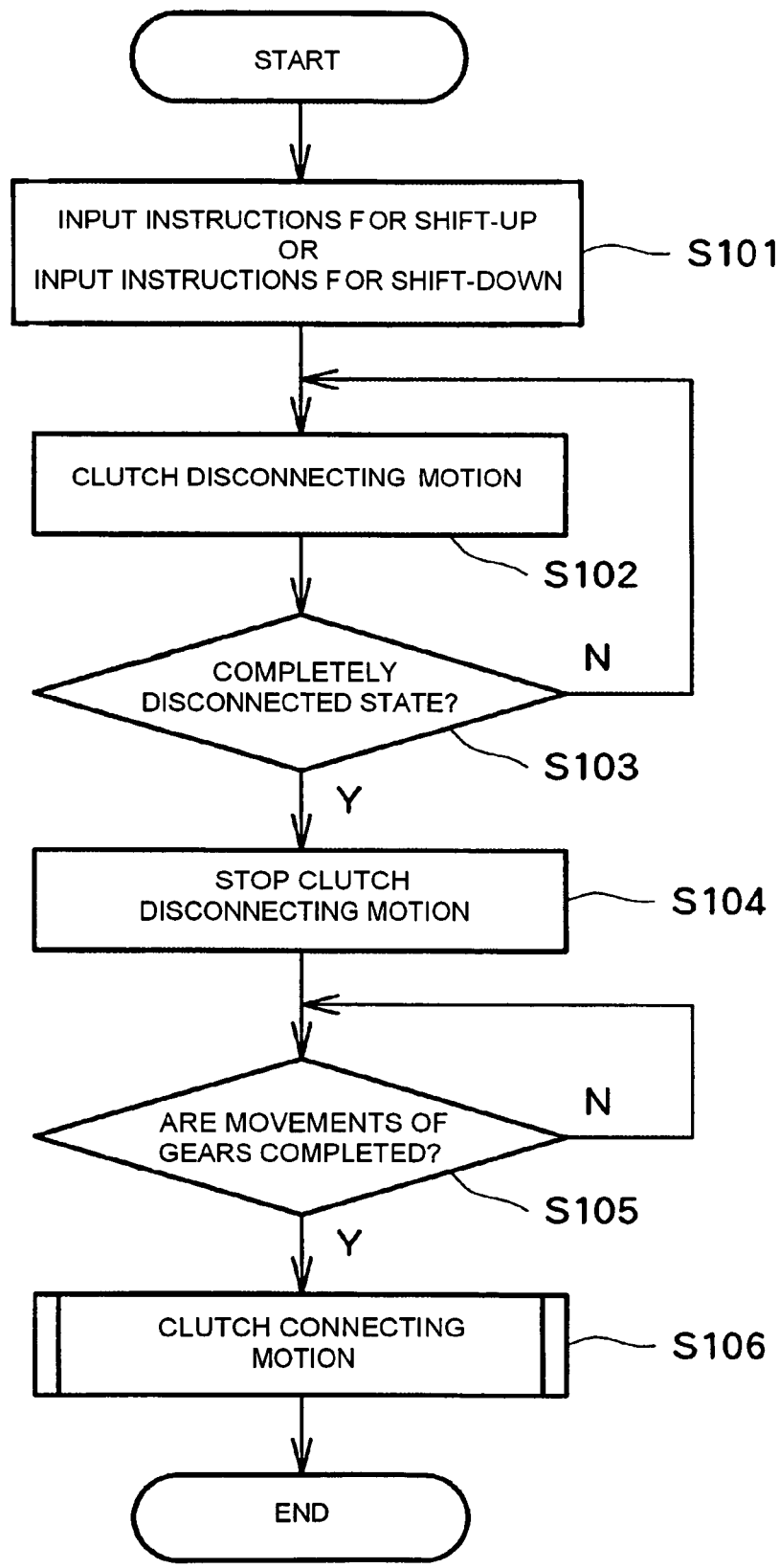
FIG. 10 is a control flowchart illustrating a clutch connection control device that is arranged and configured in accordance with certain features, aspects and advantages of the present invention.
Figure 11:
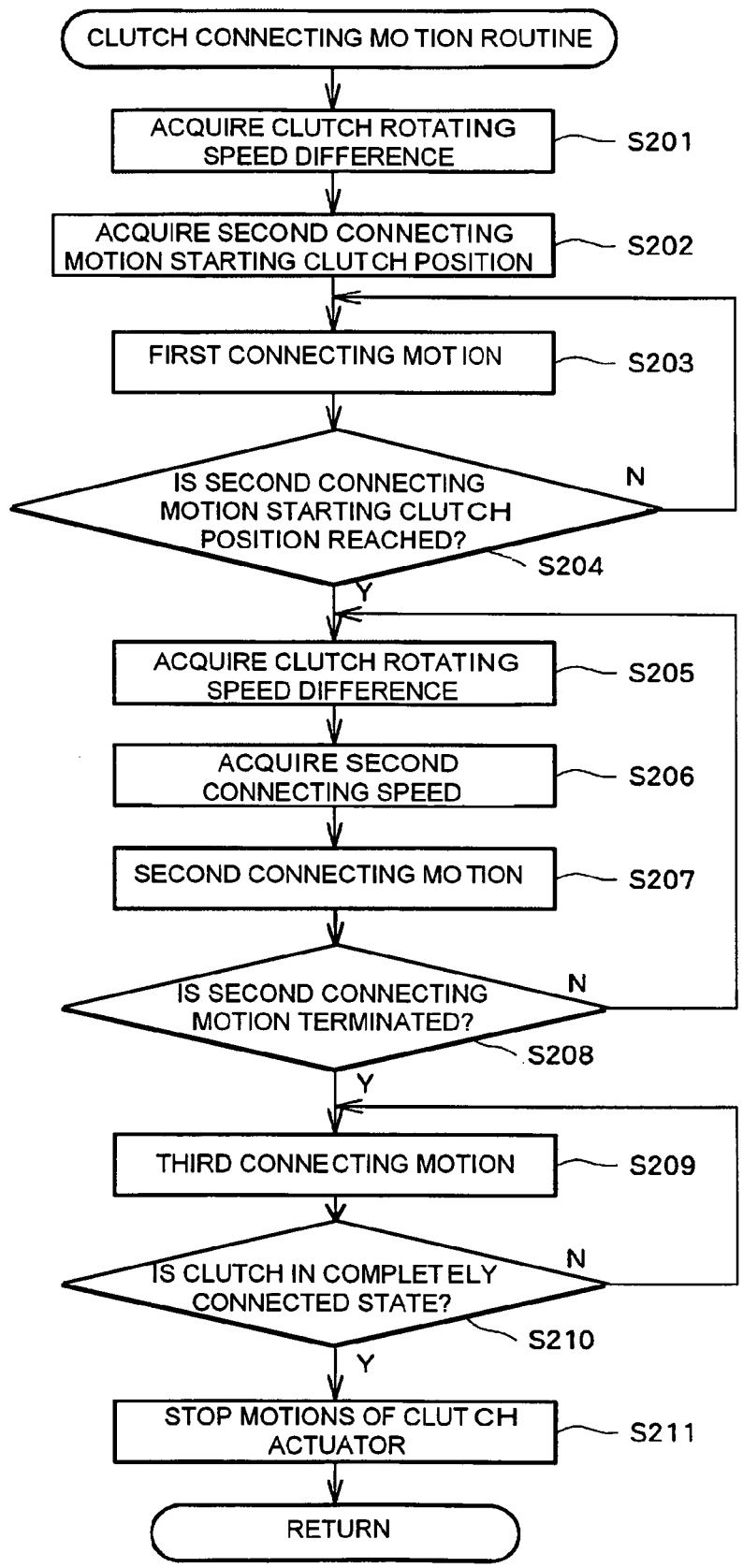
FIG. 11 is a control flowchart illustrating a clutch connecting motion routine of FIG. 10.

With reference now to FIG. 10 and FIG. 11, the rider can indicate a desire to change gears by actuating (e.g., placing in or toggling into an ON position) either the up-shift switch 91 or the down-shift switch 96. See S101. When the rider actuates the up-shift switch 91 or the down-shift switch 96, gear shift instructing information indicative of the desired up-shift or down-shift is communicated to the control device 10 (e.g., the main microcomputer 1).

The clutch actuator control unit 11 then operates the clutch actuator 41 to disengage the clutch. See S102. In one configuration, the clutch actuator control unit 11 outputs a clutch actuator control signal to the motor drive circuit 42. The clutch actuator control signal thereby operates the clutch actuator 41 and disengagement of the clutch begins. While the clutch is being disengaged, the clutch disengagement motion unit 18 determines, based upon clutch position information, whether the clutch has reached the completely disengaged state. See S103. Once the clutch has become disengaged, the clutch actuator 41 is stopped. See S104. As used herein, "disengaged" corresponds to a clutch position in which a drive force of an engine generally is not transmitted to the transmission and/or the wheels.

After gear change instructing information is communicated from the up-shift switch 91 or the down-shift switch 96, the shift actuator control unit 19 preferably tracks the passage of time from the command or communication. The passage of time can be used to accommodate the disengagement of the clutch, for instance.

When it is judged that a predetermined period has elapsed (i.e., a shift motion start lag time), the shift actuator control unit 19 turns the shift actuator 51 in a direction that corresponds to the requested gear change. Preferably, the shift actuator control unit 19 outputs a shift actuator control signal to the motor drive circuit 52, which effects movement of the shift actuator 51. While the shift arm turns, the shift cam shaft that is engaged by the shift arm rotates with the shift arm to realize a gear change.

During the shifting motion, the shift actuator control unit 19 monitors the angle that the shift actuator 51 turns with shift-actuator turning angle information acquired from the shift potentiometer 54. The shift actuator control unit 19 determines whether the shift actuator 51 has reached the maximum angle. The shift actuator control unit 19 stops movement of the shift actuator 51 when the shift actuator 51 reaches the maximum angle. Thus, the shift actuator 51 preferably stops at the maximum angle.

The clutch actuator control unit 11 acquires gear position information from the gear position sensor 93 to evaluate when the gear movement has been completed. Preferably, the gear movement completion judging unit 21 acquires the gear position information from the output voltage of the gear position sensor 93 to judge whether the gear shift has been completed. Until completion of gear movement, acquisition of gear position and the judgment of completion or incompletion preferably repeat. See S105. When it is judged that the gears have successfully been shifted, the gear movement completion judging unit 21 communicates such judgment to the second engagement motion starting clutch position acquiring unit 13 and to the clutch engagement speed varying unit 14.

Clutch engagement motion then is started. See S106. In other words, the control unit 10 starts transitioning from the completely disengaged state to the engaged state (i.e., a clutch engagement motion) when it is determined that the gear change has been completed. See FIG. 11.

The second engagement motion starting clutch position acquiring unit 13 acquires clutch rotating speed difference information from the clutch rotating speed difference calculating unit 12. See S201. On the basis of the clutch rotating speed difference, the second engagement motion starting clutch position acquiring unit 13 determines a second engagement motion starting clutch position from the second engagement motion starting clutch position map. See S202. The second engagement motion starting clutch position acquiring unit 13 communicates the acquired second engagement motion starting clutch position to the clutch engagement speed varying unit 14.

In the course of the clutch engagement motion, the clutch actuator control unit 11 first performs an engagement motion of the clutch at the first engagement speed (i.e., the first engagement motion). Here, the first engagement speed is the engagement speed of the clutch that has been pre-stored in the clutch actuator control unit 11 or an associated memory location. Preferably, the first engagement speed is generally constant with time.

The clutch engagement speed varying unit 14 communicates the first engagement speed to the clutch engagement motion unit 16 whereby the first engagement motion is started. See S203. Preferably, the clutch engagement motion unit 16 operates the clutch actuator 41 on the basis of the communicated clutch engagement speed. In some configurations, the first engagement motion can begin before the clutch rotating speed difference information and the corresponding second engagement motion starting clutch position are obtained.

During the first engagement motion, the clutch engagement speed varying unit 14 judges on the basis of clutch position information whether the clutch position has reached the second engagement motion starting clutch position. See S204. When the first engagement motion begins, the second engagement motion starting clutch position is communicated to the clutch engagement speed varying unit 14 from the second engagement motion starting clutch position acquiring unit 13. During the first engagement motion, the clutch engagement speed varying unit 14 monitors the clutch position on the basis of clutch position information acquired from the clutch potentiometer 44 to determine whether the second engagement motion starting clutch position has been attained. When it is determined that the clutch has reached the second engagement motion starting clutch position, communication to the clutch engagement motion unit 16 is stopped.

In other words, the first engagement motion continues until the second engagement motion starting clutch position is reached.

When the clutch position reaches the second engagement motion starting clutch position, the clutch engagement speed varying unit 14 acquires clutch rotating speed difference information from the clutch rotating speed difference calculating unit 12. See S205. The clutch engagement speed varying unit also acquires, on the basis of the clutch rotating speed difference information, the second engagement speed from the second engagement speed map stored in the clutch engagement speed storage unit 15. See S206.

While the second engagement motion makes use of mapped data, it is possible to feature a clutch engagement configuration in which a clutch engagement speed may be acquired from a map or equation beginning with the first engagement motion. In such a configuration, the engagement speed map can feature an initial connection speed that is faster than the second engagement speed until the clutch rotating speed difference becomes less than or equal to a predetermined threshold. Other configurations also can be used.

In any event, the second engagement speed is communicated to the clutch engagement motion unit 16, engagement of the clutch is performed at the second engagement speed, and the second engagement motion is started. See S207. The second engagement speed preferably is determined according to a sensed or actual difference in clutch component rotating speeds (i.e., a second engagement speed). In one preferred embodiment, the second engagement speed advantageously is one that is slower than the first engagement speed and the clutch actuator control unit 11 changes the speed over time based upon the sensed or actual difference in clutch component rotating speeds.

During the second engagement motion, the clutch actuator control unit 11 preferably samples the clutch rotating speed difference at predetermined intervals (e.g., every 1 msec). The clutch actuator control unit 11 comprises the second engagement speed map that correlates clutch rotating speed differences with desired second engagement speeds. When the clutch rotating speed difference is acquired, the clutch actuator control unit 11 acquires from the second engagement speed map the second engagement speed that corresponds to the acquired clutch rotating speed difference. Once the second engagement speed is acquired, the clutch actuator 41 is instructed to move the clutch at the acquired second engagement speed. As a result, when a clutch rotating speed difference varies in the course of the second engagement motion, the second engagement speed also varies according to the variation.

In the second engagement motion, the clutch engagement speed varying unit 14 acquires clutch rotating speed difference information and clutch position information to judge whether the clutch rotating speed difference and the clutch position meet the second engagement motion terminating conditions. See S208. If the second engagement motion terminating condition is not met, the procedure returns again to the processing of S205 to perform engagement of the clutch at the second engagement speed, which is varied according to the clutch rotating speed difference. When both the clutch position and the clutch rotating speed difference meet the predetermined conditions (i.e., a second engagement motion terminating condition) during the second engagement motion, the clutch actuator control unit 11 terminates the second engagement motion. The second engagement motion terminating condition preferably requires that the clutch rotating speed difference is less than or equal to a second motion termination enabling rotating speed difference and that the clutch position is less than or equal to a second motion termination enabling position.

When both the clutch position and the clutch rotating speed difference meet the second engagement motion terminating condition (i.e., when the second engagement motion is terminated), the clutch engagement speed varying unit 14 stops communication of the second engagement speed to the clutch engagement motion unit 16 and starts communicating the third engagement speed. In addition, when the clutch position and the clutch rotating speed difference meet the second engagement motion terminating condition, the clutch engagement speed varying unit 14 communicates such judgment to the shift actuator control unit 19.

Receiving such a communication, the shift actuator control unit 19 turns the shift actuator 51 in the direction that returns the shift actuator to the reference angle. In the course of this shift return motion, the shift actuator control unit 19 judges on the basis of shift-actuator turning angle information when the shift actuator 51 reaches the reference angle. When the shift actuator 51 reaches the reference angle, the shift actuator control unit 19 stops the shift actuator 51. Thus, after receiving from the clutch actuator control unit 11 a communication to the effect that the clutch meets the second engagement motion terminating condition, the shift actuator control unit 19 performs a motion to return the shift actuator 51 to the reference angle (a shift return motion).

In the second engagement motion, if it is determined that the clutch position and the clutch rotating speed difference meet the second engagement motion terminating condition. See S208. The clutch engagement speed varying unit 14 then terminates communication of the second engagement speed to the clutch engagement motion unit 16 and begins to communicate the third engagement speed thereto. See S209. The third engagement speed preferably does not vary with time. More preferably, the third engagement speed is one that is slower than the second engagement speed and the clutch actuator control unit 11 does not vary the speed over time. Thus, the third engagement motion is started.

In some configurations, however, the clutch engagement speed for the third engagement motion may be acquired on the basis of an engagement speed map, either the same map as that used for the second engagement motion or another one in which the clutch rotating speed difference and the clutch engagement speed correspond to each other. Formulas also can be used. Movement based upon such maps or formulas can continue until the clutch reaches the completely connected state without setting the second engagement motion terminating condition. An engagement speed map can be set so that the clutch engagement speed increases relative to the second engagement speed when then clutch rotating speed difference becomes less than or equal to a predetermined threshold.

In the third engagement motion, the clutch engagement speed varying unit 14 monitors the clutch position on the basis of clutch position information to judge whether the clutch has reached the completely engaged state. See S210. If the clutch has reached the completely engaged state, the clutch engagement speed varying unit 14 terminates communication of the second engagement speed to the clutch engagement motion unit 16 and the clutch engagement motion unit 16 stops the clutch actuator 41. Thus, the engagement motion of the clutch is terminated. See S211.

If the clutch does not reach the completely engaged state, steps S209 and S210 are repeated and the third engagement motion is continued, during which the clutch engagement speed varying unit 14 continues to monitor the clutch position to judge when the clutch has reached the completely engaged state. See S210.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A clutch connection control device for engagement and disengagement of a clutch, the engagement and disengagement being performed by a clutch actuator, the device comprising a clutch rotating speed difference detecting means that detects a difference in rotating speed between a drive side and a driven side of the clutch, clutch engagement speed varying means that varies a clutch engagement speed in proportion to variation in the clutch rotating speed difference detected by the clutch rotating speed difference detecting means, and clutch connecting means that causes the drive side and the driven side of the clutch to approach each other at the clutch engagement speed varied by the clutch engagement speed varying means.

2. The device of claim 1, wherein the clutch rotating speed difference detecting means periodically detects the clutch rotating speed difference.

3. The device of claim 2 in combination with a straddle-type vehicle.

4. The device of claim 2, wherein the clutch engagement speed varying means further comprises clutch engagement speed storage means that stores a map indicative of a relationship between a clutch rotating speed difference and a clutch engagement speed, and the clutch engagement speed varying means varies the clutch engagement speed according to the clutch rotating speed difference based upon the map stored in the clutch engagement speed storage means.

5. The device of claim 4 in combination with a straddle-type vehicle.

6. The device of claim 4, wherein the clutch engagement speed storage means comprises data for more than one gear change combination.

7. The device of claim 6 in combination with a straddle-type vehicle.

8. The device of claim 1 in combination with a straddle-type vehicle.

9. The device of claim 1, wherein the clutch engagement speed varying means further comprises clutch engagement speed storage means that stores a map indicative of a relationship between a clutch rotating speed difference and a clutch engagement speed, and the clutch engagement speed varying means varies the clutch engagement speed according to the clutch rotating speed difference based upon the map stored in the clutch engagement speed storage means.

10. The device of claim 9 in combination with a straddle-type vehicle.

11. The device of claim 9, wherein the clutch engagement speed storage means comprises data for more than one gear change combination.

12. The device of claim 11 in combination with a straddle-type vehicle.

13. The device of claim 1, wherein the clutch engagement speed storage means comprises data for more than one gear change combination.

14. The device of claim 13 in combination with a straddle-type vehicle.

15. A clutch engagement control method for engagement and disengagement of a clutch using a mechanical clutch actuator, the method comprising:
    detecting a clutch rotating speed difference, which is a difference between a rotating speed of a drive side of the clutch and a rotating speed of a driven side of the clutch,
    varying a clutch engagement speed in proportion to the detected clutch rotating speed difference, and
    moving the drive side and the driven side of the clutch toward each other at the varied clutch engagement speed.

16. The method of claim 15, wherein the clutch rotating speed difference is detected on a periodic basis.

17. The method of claim 15, wherein the clutch rotating speed difference is detected on a periodic basis having a period less than a time required for a clutch to move from a disengaged state to an engaged state.

18. The method of claim 17, wherein the period is about 1 millisecond.

19. The method of claim 15, wherein the moving of the drive side and the driven side of the clutch also comprises moving the drive side and the driven side together at a rate that is constant over time for a portion of the distance between the drive side and the driven side.

* * * * *